(12) United States Patent
Petty

(10) Patent No.: US 6,792,381 B2
(45) Date of Patent: Sep. 14, 2004

US006792381B2

(54) APPARATUS AND METHOD FOR LOCATING DEVICES USING AN ACOUSTIC GYROSCOPE

(75) Inventor: Norman W. Petty, Columbia Falls, MT (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 10/140,134

(22) Filed: May 6, 2002

(65) Prior Publication Data

US 2003/0208336 A1 Nov. 6, 2003

(51) Int. Cl.[7] ............................................. G06F 15/00
(52) U.S. Cl. ...................................... 702/152; 702/150
(58) Field of Search ................................. 701/200, 207, 701/213, 214, 216, 220, 221, 217, 244; 702/150; 340/671, 967, 973, 974, 975, 976; 73/178 R, 65.1, 862.381, 503.3, 504.2, 504.12; 202/150, 152

(56) References Cited

U.S. PATENT DOCUMENTS

| | | | | |
|---|---|---|---|---|
| 4,672,848 A | * | 6/1987 | Gohin et al. | 73/504.05 |
| 4,903,531 A | * | 2/1990 | LeBlond et al. | 73/504.05 |
| 5,052,225 A | * | 10/1991 | Ishii | 73/504.05 |
| 5,757,103 A | * | 5/1998 | Lee et al. | 310/309 |
| 5,764,014 A | * | 6/1998 | Jakeway et al. | 318/587 |
| 5,780,739 A | * | 7/1998 | Kang et al. | 73/504.16 |
| 5,780,740 A | * | 7/1998 | Lee et al. | 73/504.12 |
| 5,780,948 A | * | 7/1998 | Lee et al. | 310/81 |
| 5,873,031 A | * | 2/1999 | Griffith et al. | 455/412 |
| 6,076,402 A | * | 6/2000 | Oh et al. | 73/504.12 |
| 6,125,285 A | * | 9/2000 | Chavez et al. | 455/557 |
| 6,195,558 B1 | * | 2/2001 | Griffith et al. | 455/456.5 |
| 6,236,858 B1 | | 5/2001 | Griffith | |
| 6,401,059 B1 | * | 6/2002 | Shen et al. | 703/27 |
| 6,452,544 B1 | * | 9/2002 | Hakala et al. | 342/357.13 |
| 6,643,587 B2 | * | 11/2003 | Brodie et al. | 701/216 |

FOREIGN PATENT DOCUMENTS

| | | | | |
|---|---|---|---|---|
| JP | 05-223577 | * | 8/1993 | G01C/19/56 |
| JP | 06-058762 | * | 3/1994 | G01C/19/56 |
| JP | 07-055473 | * | 3/1995 | G01C/19/56 |
| JP | 07-318353 | * | 12/1995 | G01C/19/56 |
| JP | 08-145684 | * | 6/1996 | G01C/19/56 |
| JP | 08-145685 | * | 6/1996 | G01C/19/56 |

* cited by examiner

Primary Examiner—John Barlow
Assistant Examiner—Douglas N Washburn
(74) Attorney, Agent, or Firm—John C. Moran

(57) ABSTRACT

Accurately determining a location of a device by using an acoustic gyroscope within the device The acoustic gyroscope is periodically adjusted using information from external sources.

27 Claims, 2 Drawing Sheets

APPARATUS AND METHOD FOR LOCATING DEVICES USING AN ACOUSTIC GYROSCOPE

TECHNICAL FIELD

This invention relates to wireless devices, and in particular, to determining the location of a wireless device.

BACKGROUND OF THE INVENTION

The need to accurately determine the position of a wireless device is important for the following three reasons: (1) the Federal Communication Commission Enhance 911 mandate requires all carriers to implement a technology for locating their wireless customers automatically. (2) The accurate position of a wireless telephone can be used to greatly improve wireless handoffs from one base station to another. (3) New applications and services are emerging to provide location dependent content to wireless telephones, wireless personal digital assistants (PDA), and other wireless systems. The prior art has approached the problem of determining the location of wireless devices by utilizing global positioning systems (GPS) and network-based locating methods. GPS methods use signals generated from 24 government satellites orbiting the Earth to determine the position of a mobile unit. Though accurate to a few meters, GPS signals are difficult to receive indoors and in some urban environments. Network-based methods involve triangulating the radio transmission or using RF multi-path finger printing methods to identify the most likely position of the radiating source. The multi-path method offers significant performance advantages over triangulation in urban environments.

Unfortunately, neither GPS nor network-based locating methods work well or at all, inside buildings. This is particularly true of office buildings or manufacturing plants which tend to utilize a great deal of concrete with reinforced steel. In addition, the problems of trying to perform either GPS or network-based locating methods within a multistoried building are compounded by the fact of excessive amount of multi-path emissions that are far greater than that encountered outside. It is well known that the handoffs of wireless telephones within multistoried office buildings from one base station to another base station can be greatly enhanced if the location of the wireless telephone can be accurately determined. However, because of the density of the base stations, the location information for the wireless telephone must be accurate to a few meters if it can be efficiently used in the handoff process.

SUMMARY OF THE INVENTION

This invention is directed to solving these and other problems and disadvantages of the prior art. An acoustic gyroscope within a device is utilized to accurately determine the location of the device and the acoustic gyroscope is periodically adjusted using information from external sources.

DETAILED DESCRIPTION

Figure 1:
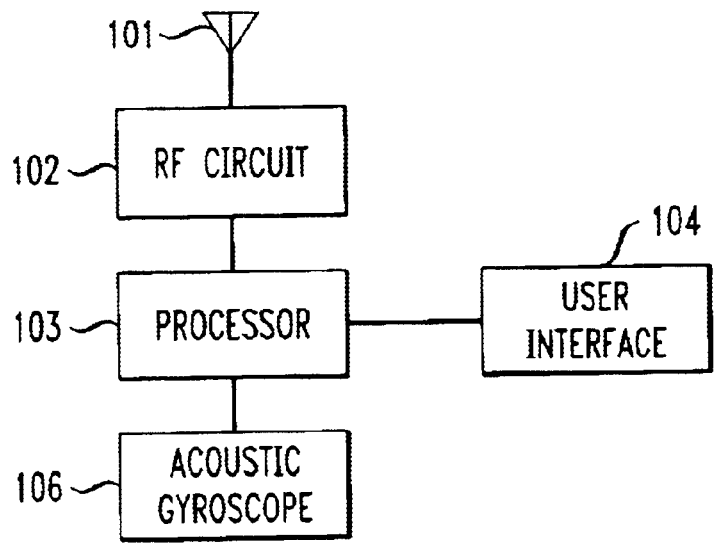
FIG. 1 illustrates an embodiment of a system for utilizing the invention.
Figure 2:
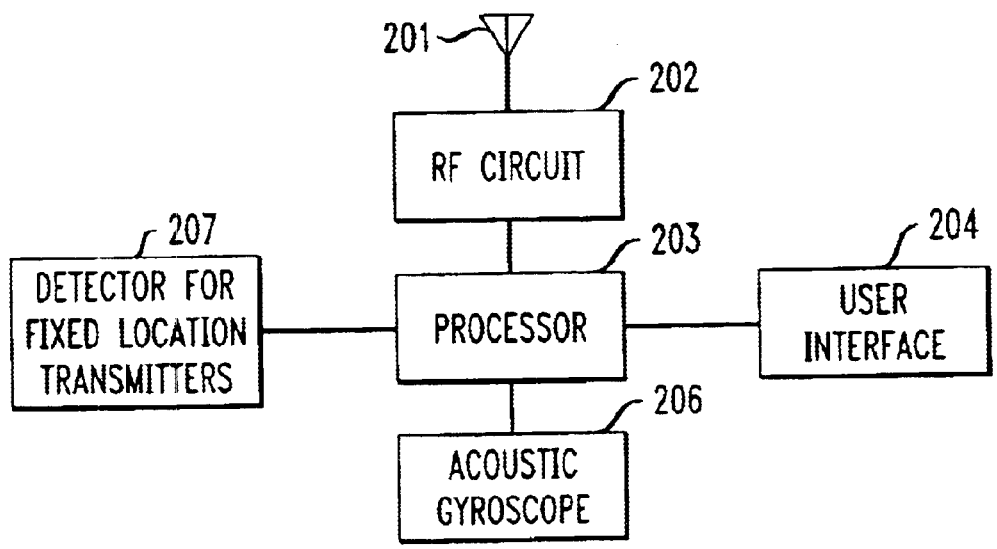
FIG. 2 illustrates an embodiment of a wireless device utilizing the invention.

FIGS. 1 and 2 illustrate embodiments of the invention. FIG. 1 illustrates an embodiment of a wireless device. Antenna 101 functions with RF circuit 102 to provide a wireless link with the wireless provider. Advantageously, the wireless provider can be a cellular system or an internal wireless system in use in a building. Processor 103 provides all of the processing necessary to carry out the standard functions of the wireless device and also, to determine the location of the wireless device based on information received from acoustic gyroscope 106. Processor 103 is also referred to as a controller and may be any type of store program controlled device, programmed logic array device or a wired logic device. User interface 104 is the mechanism used by a user to utilize the wireless device. If the wireless device is a cellular or wireless telephone, user interface 104 will consist of the dialing keyboard, control buttons, and the headset that allows the user to talk and hear human speech. Similarly, if the wireless device is a personal digital assistant (PDA) the user interface will be that needed to perform the functions of a PDA.

In FIG. 1, processor 103 utilizing information received from the wireless provider periodically determines the location of the wireless device utilizing such well known techniques as triangulating the radio transmission or using RF multi-path finger printing methods to identify the most likely position of the radiating source. Once the radiating sources are determined, processor 103 then determines the location of the wireless device and utilizes this location information to adjust the location information that has been determined by acoustic gyroscope 106. Acoustic gyroscopes are well known in the art and U.S. Pat. Nos. 6,076,402, 5,780,948, 5,780,740, 5,780,739, and 5,757,103, which are hereby incorporated by reference, illustrate acoustic gyroscopes and their control.

FIG. 2 illustrates an embodiment of the invention that utilizes fixed location transmitters to perform periodic determination of the location for verifying the acoustic gyroscope calculations. Systems utilizing fixed location transmitters to determine the location of a wireless terminal are disclosed in U.S. Pat. Nos. 6,236,858, 6,195,558, 5,873,031, and 6,125,285 which are hereby incorporated by reference. The fixed location transmitters would be located at strategic locations around a building that were commonly passed by individuals on a regular basis. Such a location could well be the entrances into the building or a cafeteria or other public locations. U.S. Pat. No. 6,236,858 is particularly well suited for the determination of when people are entering or leaving exits of a building. In another embodiment, the wireless device would receive its location information from the wired communication terminal within the user's work area. In this embodiment, U.S. Pat. No. 6,125,285 is particularly well suited for this use.

Figure 3:
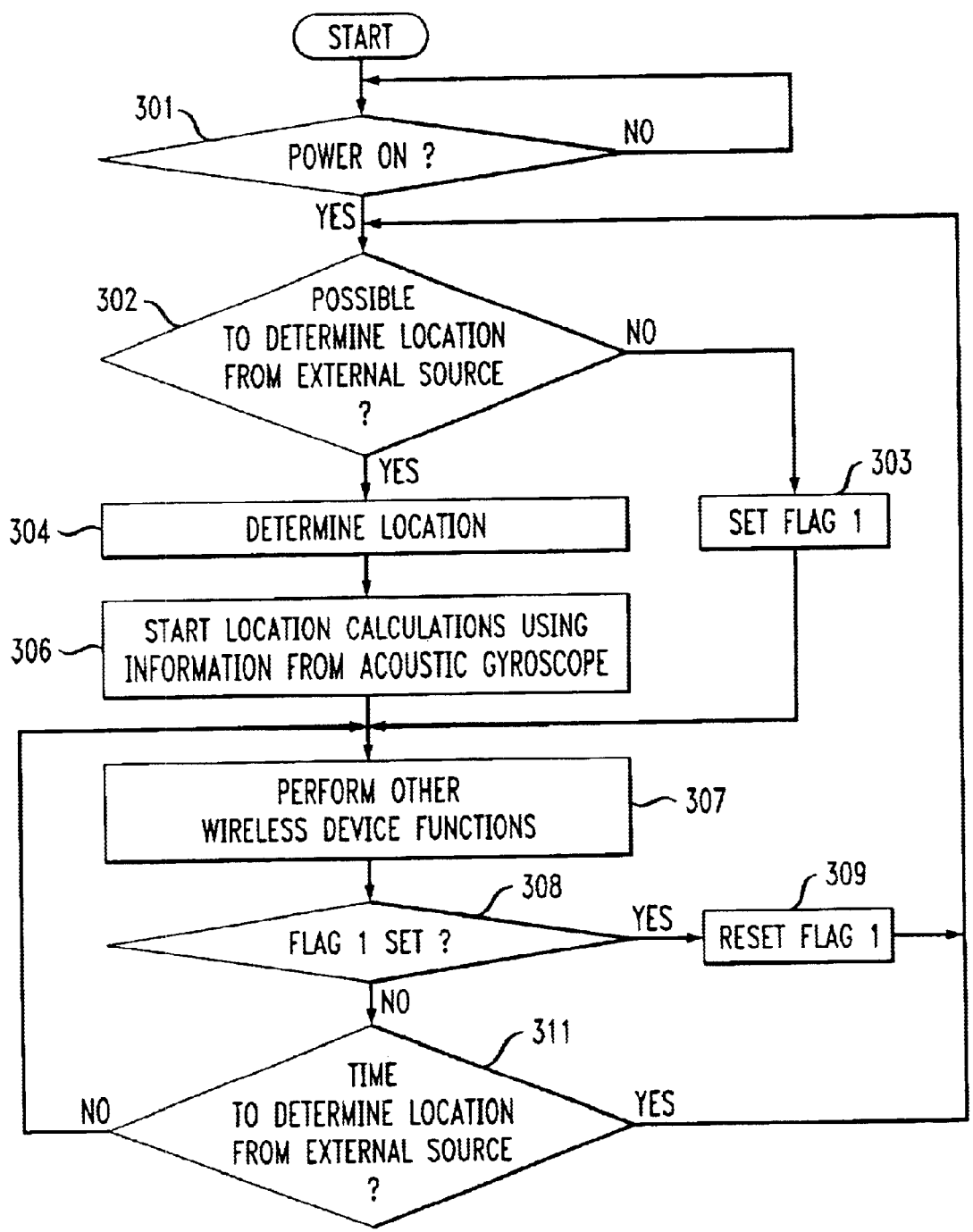
FIG. 3 illustrates, in flow chart form, an embodiment of the operations performed by a wireless device in utilizing the invention.

FIG. 3 shows an embodiment of the invention in flowchart form. Once started, decision block 301 waits until the power is turned on. After the power is turned on, decision block 302 determines if it is possible to determine the location from an external source. The external source may well be fixed transmitters or the utilization of network-based location methods. It is possible that the wireless device is in a location where it can not determine its location from an external source. If the answer in decision block 302 is no, block 303 sets flag one and transfers control to block 307. Flag one being set indicates that the location had not been determined or verified from an external source at the appropriate time. If the answer in decision block 302 is yes, block 304 determines the location from the external source, and block 306 starts the location calculations utilizing the determined location from block 304 and information from acoustic gyroscope. After execution of block 306, control is transferred to block 307. Block 307 performs the other wireless device functions. In the case of a wireless telephone, this would consist of making telephone calls and receiving calls, etc. After execution of block 307, flag one is tested to see if it is set by decision block 308. If the answer is yes in decision block 308, block 309 resets flag one and transfers control back to decision block 302 so as to determine if the location can be determined from an external source. If the answer in decision block 308 is no, decision block 311 determines if it is time to determine the location from an external source. The time is set as a periodic time so that the wireless device is constantly verifying its location from an external source. If the answer is no in decision block 311, control is transferred back to block 307. If the answer is yes in decision block 311, control is transferred back to decision block 302 where it is attempted to determine the location from an external source.

Of course, various changes and modifications to the illustrative embodiment described above will be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. Apparatus for determining a location of a device, comprising:
    acoustic gyroscope;
    controller for calculating the location of the device from information received from the acoustic gyroscope;
    the controller further responsive to external location information for adjusting the acoustic gyroscope;
    a detector for receiving information from local fixed location transmitters; and
    the controller further responsive to the received information for calculating the location of the device to generate the external location information.

2. Apparatus for determining a location of a wireless telephone, comprising:
    acoustic gyroscope;
    controller for calculating the location of the wireless telephone from information received from the acoustic gyroscope; and
    the controller further responsive to external location information for adjusting the acoustic gyroscope.

3. The apparatus of claim 2 further comprises a wireless circuit for receiving wireless transmissions from external transmitting stations; and
    the controller further responsive to the received wireless transmissions for calculating the location of the device to generate the external location information.

4. Apparatus for determining a location of a wireless personal digital assistant, comprising:
    acoustic gyroscope;
    controller for calculating the location of the wireless personal digital assistant from information received from the acoustic gyroscope; and
    the controller further responsive to external location information for adjusting the acoustic gyroscope.

5. The apparatus of claim 4 further comprises a wireless circuit for receiving wireless transmissions from external transmitting stations; and
    the controller further responsive to the received wireless transmissions for calculating the location of the device to generate the external location information.

6. A wireless telephone for determining a location of the wireless telephone, comprising:
    acoustic gyroscope;
    controller for calculating the location of the wireless telephone from information received from the acoustic gyroscope;
    wireless circuit for receiving wireless transmissions from external transmitting stations;
    the controller further responsive to the received wireless transmissions for generating external location information; and
    the controller further responsive to external location information for adjusting the acoustic gyroscope.

7. A wireless personal digital assistant for determining a location of the wireless personal digital assistant, comprising:
    acoustic gyroscope;
    controller for calculating the location of the wireless personal digital assistant from information received from the acoustic gyroscope;
    wireless circuit for receiving wireless transmissions from external transmitting stations;
    the controller further responsive to the received wireless transmissions for generating external location information; and
    the controller further responsive to external location information for adjusting the acoustic gyroscope.

8. A wireless device for determining a location of the wireless device, comprising:
    acoustic gyroscope;
    controller for calculating the location of the wireless device from information received from the acoustic gyroscope;
    a detector for receiving information from local fixed location transmitters;
    the controller further responsive to the received information for calculating external location information; and
    the controller further responsive to external location information for adjusting the acoustic gyroscope.

9. The apparatus of claim 8 wherein the wireless device is a wireless telephone.

10. The apparatus of claim 8 wherein the wireless device is a wireless personal digital assistant.

11. A method for determining a location of a wireless telephone, comprising the steps of:
    analyzing information from an acoustic gyroscope;
    calculating the location of the wireless telephone from the analyzed information; and
    adjusting the acoustic gyroscope periodically using external location information.

12. A method for determining a location of a wireless personal digital assistant, comprising the steps of:
    analyzing information from an acoustic gyroscope;
    calculating the location of the wireless personal digital assistant from the analyzed information; and
    adjusting the acoustic gyroscope periodically using external location information.

13. A method for determining a location of a device, comprising the steps of:

analyzing information from an acoustic gyroscope;

calculating the location of the device from the analyzed information;

adjusting the acoustic gyroscope periodically using external location information;

receiving the external location information from local fixed location transmitters; and the step of adjusting comprises the steps of generating adjustment information from the received external location information and transmitting the adjustment information to the acoustic gyroscope.

14. A method for determining a location of a wireless telephone, comprising the steps of:

analyzing information from an acoustic gyroscope;

calculating the location of the wireless telephone from the analyzed information;

receiving the external location information from external transmitting stations;

generating periodically adjustment information from the received external location information;

transmitting the adjustment information to the acoustic gyroscope, adjusting the acoustic gyroscope periodically using the generated adjustment information.

15. A method for determining a location of a wireless personal digital assistant, comprising the steps of:

analyzing information from an acoustic gyroscope;

calculating the location of the wireless personal digital assistant from the analyzed information;

receiving the external location information from external transmitting stations;

generating periodically adjustment information from the received external location information;

transmitting the adjustment information to the acoustic gyroscope, adjusting the acoustic gyroscope periodically using the generated adjustment information.

16. A method for determining a location of a wireless device, comprising the steps of:

analyzing information from an acoustic gyroscope;

calculating the location of the device from the analyzed information;

receiving the external location information from local fixed location transmitters;

generating periodically adjustment information from the received external location information;

transmitting the adjustment information to the acoustic gyroscope, adjusting the acoustic gyroscope periodically using the generated adjustment information.

17. The method of claim 16 wherein the wireless device is a wireless telephone.

18. The method of claim 16 wherein the wireless device is a wireless personal digital assistant.

19. An apparatus for calculating a position of a wireless device, comprising:

means for periodically receiving location information from external cellular base stations;

means for obtaining the position of the wireless device from an acoustic gyroscope;

means for analyzing the received location information to determine an adjustment for the acoustic gyroscope using multi-path calculations; and transmitting the adjustment to the acoustic gyroscope.

20. The apparatus of claim 19 wherein the wireless device is a wireless telephone.

21. The apparatus of claim 19 wherein the wireless device is a wireless personal digital assistant.

22. An apparatus for calculating a position of a wireless device, comprising:

means for periodically receiving location information from local fixed location transmitters via infra-red transmission;

means for obtaining the position of the wireless device from an acoustic gyroscope;

means for analyzing the received location information to determine an adjustment for the acoustic gyroscope; and transmitting the adjustment to the acoustic gyroscope.

23. The apparatus of claim 22 wherein the wireless device is a wireless telephone.

24. The apparatus of claim 22 wherein the wireless device is a wireless personal digital assistant.

25. An apparatus for calculating a position of a wireless device, comprising:

means for periodically receiving location information from external cellular base stations;

means for obtaining the position of the wireless device from an acoustic gyroscope;

means for analyzing the received location information to determine an adjustment for the acoustic gyroscope using triangulation calculations; and transmitting the adjustment to the acoustic gyroscope.

26. The apparatus of claim 25 wherein the wireless device is a wireless telephone.

27. The apparatus of claim 24 wherein the wireless device is a wireless personal digital assistant.

* * * * *